United States Patent [19]

Fisher

[11] Patent Number: 4,567,977
[45] Date of Patent: Feb. 4, 1986

[54] DELAYED RESTRAINT RELEASE DEVICE FOR INFLATABLE ESCAPE SLIDES

[75] Inventor: John M. Fisher, Cuyahoga Falls, Ohio

[73] Assignee: The B. F. Goodrich Company, Akron, Ohio

[21] Appl. No.: 610,055

[22] Filed: May 14, 1984

[51] Int. Cl.⁴ ............................................. A62B 1/20
[52] U.S. Cl. ..................................... 193/25 B; 92/29; 182/48; 188/317; 403/341
[58] Field of Search ....................... 193/25 B; 182/48; 403/341, 340, 31; 188/317, 272; 92/29

[56] References Cited

U.S. PATENT DOCUMENTS

| | | | |
|---|---|---|---|
| 3,606,939 | 9/1971 | Summer et al. | 193/25 B |
| 3,897,861 | 8/1975 | Miller et al. | 193/25 B |
| 3,944,023 | 3/1976 | Fisher | 182/48 |

Primary Examiner—Jeffrey V. Nase
Attorney, Agent, or Firm—Joseph Januszkiewicz

[57] ABSTRACT

A delayed restraint releaseable device utilized to restrain and controllably release the lower end of an inflating escape slide at a predetermined pressure, orientation and time. The device combines two distinct restraint mechanisms into one combination unit. The primary release is accomplished by means of shear pin or pins located at the first end of the device. Under normal conditions, the release is accomplished by shearing of the pin or pins under the load provided by the tied back inflating slide. The back-up release, in series with the primary release, occurs when the pressure of the reduced load causes a piston within the restraint to move against both a spring and captive fluid. As the piston moves, the fluid transfers through a precise sized orifice in the piston, from one side of the piston to the other. The piston moves eventually to a point at which the interlocking leg of the piston support shaft is released, thus allowing the ends of the mechanism to separate.

7 Claims, 6 Drawing Figures

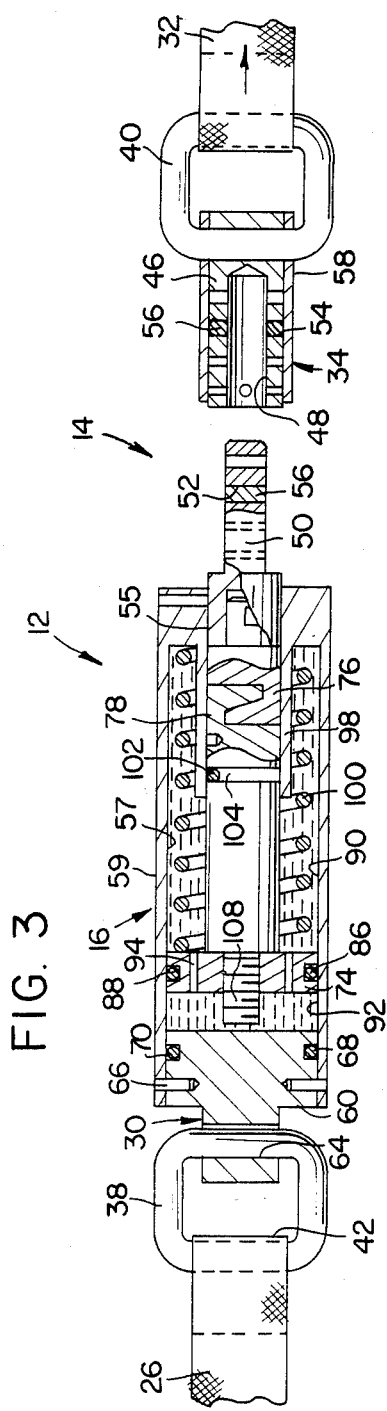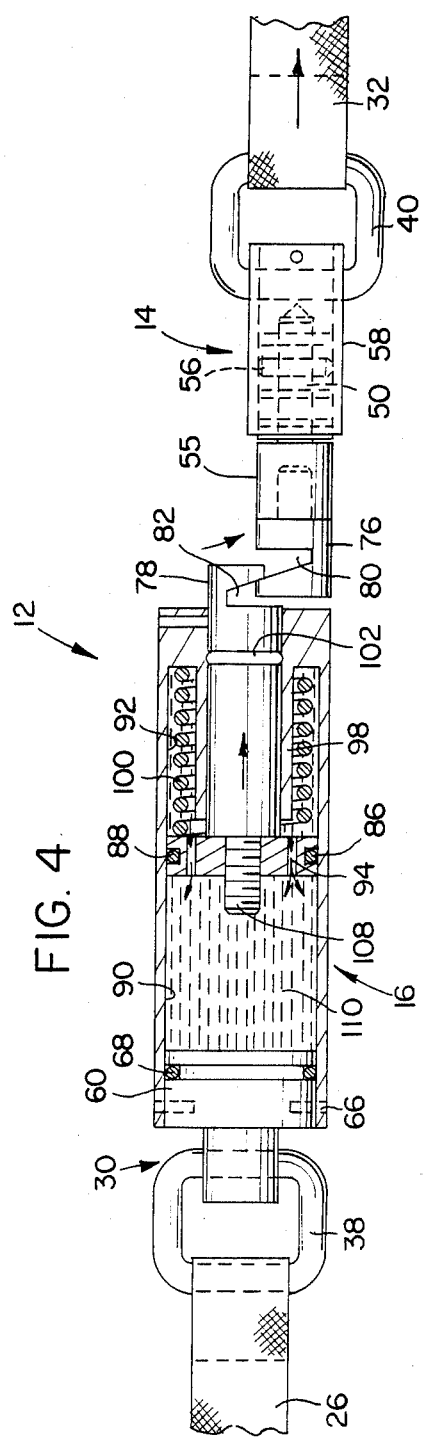

DELAYED RESTRAINT RELEASE DEVICE FOR INFLATABLE ESCAPE SLIDES

BACKGROUND OF THE INVENTION

This invention relates to inflatable emergency evacuation slides used primarily on aircraft, off-shore drilling platforms and the like. More particularly this invention relates to delayed restraint release devices and redundant systems used in conjunction with the deployment of such slides.

In the case of off-shore drilling platform break-ups, aircraft crash landings or other aircraft emergencies away from airport terminal building, it is normally desirable to evacuate the passengers and cargo as quickly as possible. Emergency evacuation slides have long been provided on most aircraft and drilling platforms for this purpose. Further discussion herein of the present invention will be generally directed to aircraft applications. It should be understood, however, that the present invention has equal applicability to many other analogous fields such as off-shore drilling platforms and the like.

Presently, the most common type of evacuation slide in use takes the form of an inflatable ramp which is stored in the aircraft adjacent an exit door in its deflated condition. In emergencies, the deflated slide is extended from the aircraft. Only then is it inflated. When the slide is extended from the aircraft it hangs in a relatively limp position. In this position it is highly vulnerable to wind deflections which often occur when a cross wind blows toward or across the evacuation exit. Under such circumstances the limp slide may be blown underneath the aircraft or elsewhere, making it completely useless when inflated. For further discussion of this problem, see U.S. Pat. No. 3,018,867 issued to Heyniger.

To eliminate the problems created by wind deflection, devices have been used to restrain the full extension of the slide until it is partially inflated to a predetermined degree. In many such devices an area of the slide adjacent its lower end is temporarily and releasably secured to an area adjacent its upper end or to the aircraft itself until a suitable inflation pressure is obtained. At such time the temporary securement permits the release and separation of the lower end from the upper end of the slide. Upon such release of the lower end of the slide, the continuing inflation pressure forces the lower end to first swing outwardly from the aircraft and then downwardly to the ground. Further discussion of the mechanism can be found in U.S. Pat. No. 3,391,771 issued to Day.

Preferably the temporary and releasable restraint release device used to secure the lower end of the slide is self releasing upon a predetermined partial extension of the slide from the aircraft. The self releasing characteristic of the restraint device eliminates human error due to lack of skill or panic as might well occur in emergency situations where the present invention is intended to be utilized.

It is preferable that the restraint device be released at a predetermined and precise inflation pressure which will normally correspond to a predetermined and precise orientation of the partially inflated slide. Deviation from this pressure can render the slide useless. Release of an uninflated or underinflated slide may cause wind deflection problems as heretofore referred to, resulting in disaster. On the other hand, undue delay in fully extending the slide similarly can be disasterous in a situation where time is of the essence.

It should also be understood that a restraint device, set to release at an inflation pressure which is too low, is inadequate since it will prematurely free the lower end of the slide and render it susceptible to wind deflections. A restraint device, set to release at too high of a pressure, is likewise, inadequate since such pressure may never be attained and will also render its slide useless.

One such type releaseable restraint device which achieves the desired objectives as set forth above and overcomes such disadvantages is described in U.S. Pat. No. 3,944,023 to Fisher. According to the disclosure of the patent, an emergency evacuation slide is precluded from full extension by the presence of a strap, separable by a shear pin, breakable only upon the attainment of a predetermined pressure in the slide. Such a releaseable restraint normally comprises two meeting components coupled by a shear pin or pins with a cover to protect the pins and protect tampering with the pins prior to use. Tension due to the inflation pressure within the slide is transmitted to the restraint device and shear pins by means of two straps, each of which couples an end of the component with a segment of the slide. Only when the pressure within the slide reaches a predetermined pressure limit will the shear pin break and release the slide to permit its full extension to the position for proper utilization.

Certain recently developed escape slides, such as those for the Boeing 747 stretch upper deck aircraft, are designed with two inflatable chambers and two associated inflation devices. Such slides are required to inflate and be utilized with only one chamber functioning. This condition requires an improved delayed type release mechanism since complications may arise when such prior art types of restraint devices are employed in an inflatable emergency evacuation slide composed of two fluidly independent inflatable chambers. Such type of emergency evacuation slide is employed for example in the stretch upper deck of the Boeing 747 aircraft and is described in U.S. Pat. No. 4,434,870, issued in the name of John M. Fisher. Such complications would occur if the pneumatic inflation mechanism for only one of the inflatable chambers were actuated while the other inflation mechanism remained unactuated or if the tubing in one of the chambers were to rip to preclude its inflation.

In a situation where the lower chamber would inflate, insufficient pressure build-up would occur to break the shear pin or pins of the primary emergency restraint release device of the aforementioned U.S. Pat. No. 3,944,023. If such a situation were to occur, a secondary or back-up delayed restraint device would have to be utilized to insure deployment of the slide even though the upper chamber were not to become inflated. Such back-up delayed restraint release device may be used, not only in a back-up mode, but also, if desired, as a primary releaseable restraint device, independent of other devices. In such a situation it would consitute the sole delayed restraint release device in its inflatable emergency evacuation slides. Such a system is disclosed in U.S. patent application Ser. No. 443,425, filed Nov. 22, 1982 now U.S. Pat. No. 4,460,062. Such devices, however, require the use of additional inflatable mechanisms on the slide for extension of a lanyard to constitute the delayed restraint feature operable in either a back-up or primary mode.

Another situation in which improved delayed restraint release devices are employed are in those situations wherein the primary device receives a sharp or large load prematurely, prior to the precise pressure being applied to the device through the inflatable members. When this occurs, the delayed restraint release device may be activated to release the slide prior to the predetermined time. In such situations it may be desirable to have a back-up member to further hold the inflatable slide in its semi-collapsed orientation until the the proper pressure is received on the back-up delayed restraint release device to only then permit deployment of the slide assembly.

SUMMARY OF THE INVENTION

The present invention relates to a delayed restraint releaseable device utilized to restrain and controllably release the lower end of an inflating escape slide at a predetermined pressure, orientation and time. The device combines two distinct restraint mechanisms into one combination unit. The primary release is accomplished by means of shear pin or pins located at the first end of the device. Under normal conditions, the release is accomplished by shearing of the pin or pins under the load provided by the tied back inflating slide. Under certain rare instances in which several adverse conditions occur simultaneously, insufficient force is available to cause the shear pins to break. This may be due to low bottle pressure of the inflating fluid, low ambient temperatures, high wind loading or the like. In this type of situation the back-up mechanism of the device functions. The back-up release, in series with the primary release, occurs when the pressure of the reduced load causes a piston within the restraint to move against both a spring and captive fluid. As the piston moves, the fluid transfers through a precise sized orifice in the piston, from one side of the piston to the other. The piston moves eventually to a point at which the interlocking leg of the piston support shaft is released, thus allowing the ends of the mechanism to separate. This secondary release mechanism is designed to occur about two or three seconds later than the time when the normal shear pin should have been released. It will normally function at a final inflation pressure that is somewhat lower than normal. This allows the slide to be deployed and utilized at a pressure slightly reduced from the optimum.

Without the delayed restraint release device of the present invention, a slide could stay in a tied back and completely unusable condition. Personnel on the ground could not release the slide because of its height above the ground. Once the delayed release functions, however, the ground personnel could assist in supporting the slide even in the underpressurized condition.

In an alternate embodiment of the invention, a piggyback restraint mechanism is utilized. Thrs alternate orientation functions to overcome the above-described undesirable shock loading conditions. The same general function occurs in the primary embodiment as well. However, in the secondary embodiment, the secondary restraint delay release mechanism is provided in parallel with the primary release mechanism rather than in series. In the event that the primary delayed restraint release mechanism prematurely activates, due to high shock conditions, a partial separation will occur, but full separation will be delayed because of the presence of the secondary restraint mechanism which will be activated after the shock condition is relieved followed by the appropriate pressures having been attained in the full deployment of the slide at the appropriate time.

Further objects and advantages will be apparent upon a reading of the following detailed description of the invention when read in association with the accompanying drawings.

BRIEF DESCRIPTION OF THE DRAWINGS

FIG. 3 is an exploded view of the device as shown in FIG. 2 but with parts broken away to shown internal constructions thereof and demonstrating the device immediately after separation by virture of the shear pins having been broken.

FIG. 4 is a view similar to FIG. 3 but showing the device immediately after separation by virtue of the shear pins not being broken, but the supplemental subsequent pressure separating the secondary or back-up release mechanisms.

DESCRIPTION OF THE PREFERRED EMBODIMENTS

Figure 1:
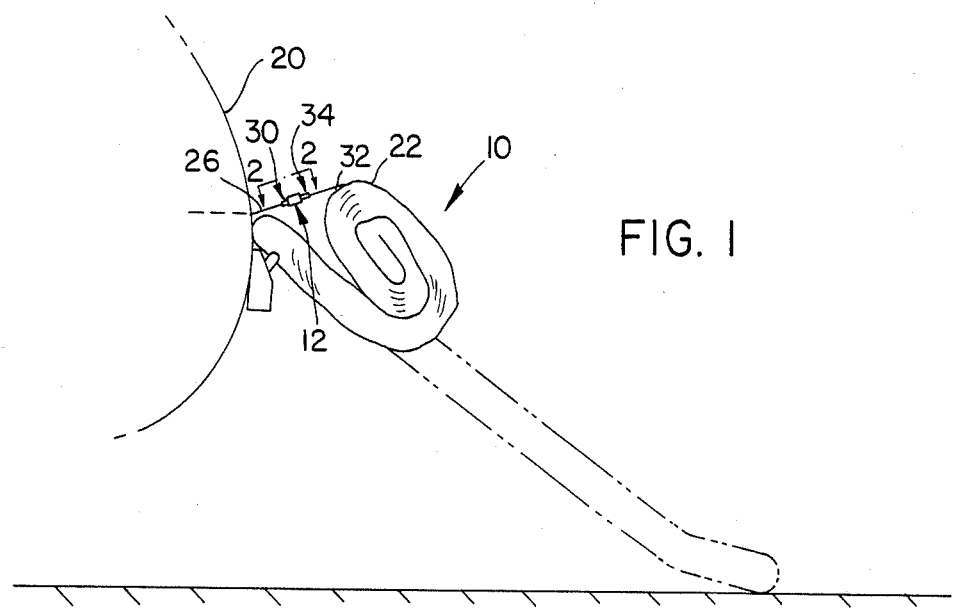
FIG. 1 is a partial side elevational view of an inflatable emergency evacuation slide, partially inflated, and illustrating the primary embodiment of the delayed restraint release device of the present invention.
Figure 2:
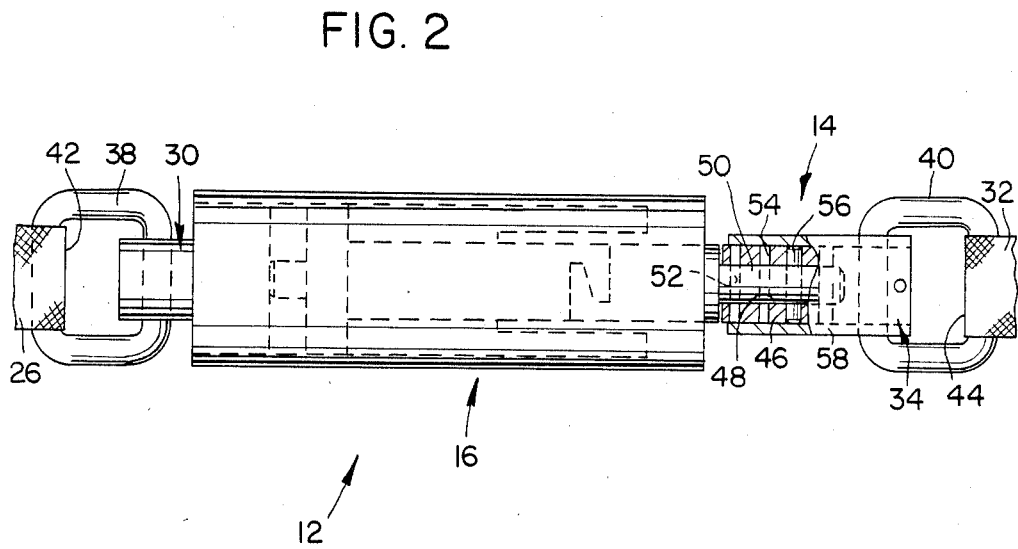
FIG. 2 is an enlarged plan view of the delayed restraint release device constructed in accordance with the present invention taken along lines 2—2 of FIG. 1 showing the device in greater detail and with parts broken away to show internal constructions thereof.

Referring now to the Figures, an inflatable emergency evacuation slide 10 is shown. In FIG. 1 the slide is shown in the partially deployed orientation with a bottle or bottles of compressed aeroform fluid inflating the slide. The inflatable slide is shown partially inflated and has begun to apply pressure to the restraint device 12. Upon continued inflation the device will be broken either by the primary 14 or secondary release mechanism 16 to permit the full deployment of the slide.

Shown in FIG. 1, the device attaches the aircraft 20 to an outboard intermediate portion 22 of the slide by means of a first strap 26 coupled between the aircraft and a first end 30 of the device. A second strap 32 is coupled between the other or second end 34 of the device and an outboard or intermediate portion of the slide. It should be appreciated that the first strap could readily be coupled to the inboard end of the slide rather than the aircraft so long as the function of temporarily securing the slide in a partially deployed state is maintained until proper inflation pressure is attained and the release mechanism separates the straps. Appropriate rings 38 and 40 couple the straps to the restraint device through loops 42 and 44 in the belts and holes in the ends of the device.

The primary release mechanism 14 of the delayed restraint release device includes a cylindrical section 46, having at its inboard end, a bored open interior 48 for the reception of the exterior end of a bayonette lug 50. This lug is provided with radial apertures 52 of varying sizes in alignment with mating apertures 54, also of varying sizes, in the receiving cylindrical section. An appropriate pin or pins 56 may be placed in the aligned apertures for shearing of the pins when the appropriate pressure load has been applied to thereby permit the full release of the restraint and deployment of the slide.

Circumferentially overlaying the cylinder is a cylindrical sheath 58, permanent in nature, to preclude unauthorized tampering with the pins and reuse of the device without appropriate supervision of aircraft personnel. The sheath is secured in its appropriate tamper proof orientation by a pin passing through the sheath into the cylindrical section. The second strap is coupled to the device by a loop passing through a loop in the strap and a radial hole in the outboard end of the cylindrical section.

FIG. 3 shows the separated bayonette coupling immediately after deployment under optimum conditions. In such circumstances the secondary restraint mechanism 16 has not been activated.

In the event that the shear pins are not activated for one reason or another and the primary release mechanism remains intact, the secondary release mechanism will be activated. This activation is shown more clearly by comparing FIG. 4 to FIG. 3. As can be seen in these Figures, the bayonette lug 50 has its interior cylindrical end 55 functioning as a piston rod coupled within the bore 57 of a primary cylindrical housing 59. The opposite or inboard end 60 of the cylindrical housing is formed with an end cap with a projecting lug having an aperture 64 secured permanently to a loop in the first strap by a ring. Mounting pins 66 extend through the cylindrical housing and into the end cap for a permanent coupling. Further, a resilient O-ring 68 is provided in a groove 70 in the end cap to form a fluid tight seal at the inboard end of the cylindrical housing.

The bayonette lug has at its interior end, its end opposite the apertured shear pin end, a piston rod and piston 74. This piston is fitted tightly and slidingly within the pneumatic cylinder bore of the cylindrical housing. The piston rod is formed of two separable sections 76 and 78, one outboard attached to the bayonette lug, the other inboard attached to the piston. The separable sections are each formed with matingly separable channels 80 and 82 to join the sections together when located within the cylindrical housing but to separate when axially slid to outside the housing to separate the device and straps. So long as the channels are within the cylindrical housing the coupling of the secondary restraint mechanism is retained. However, the piston and rod are axially reciprocally mounted within the cylindrical housing for movement under pressure.

The piston is provided with an O-ring 86 in a groove 88 to provide separate fluid compartments 90 and 92 on the first side and second side of the cavity within the cylindrical chamber. Precisely designed orifices 94 are provided within the piston to permit the flow of fluid from one side of the chamber to the other during the activation cycle.

Also milled within the pneumatic cylinder is a cylindrical wall 98 for the reception of a coil spring 100 to provide resistance to the movement of the piston from its inoperative position as shown in FIG. 3 to the operative position as shown in FIG. 4.

The internal surface of the cylindrical wall also forms a bearing surface for guiding the axially sliding motion of the piston rod during deployment. A third O-ring 102 is positioned in a groove 104 in the inboard segment of the piston rod in bearing engagement with the internal surface of the cylindrical wall to complete the fluid tight seal of the fluid within the cylindrical housing.

A threaded bottoming screw 108 is also provided in the tapped center of the piston for appropriate adjustment and orientation of the piston within the bore of the pneumatic cylindrical housing. Thus it can be seen that a motion-imparing fluid 110 such as silicone oil, operable over a wide range of temperature and pressure conditions can be provided on both sides of the piston within the bore to accurately control the movement of the piston when acted upon by pressure applied by the inflation of the slide being deployed.

In those situations where the primary shear pins do not release, pressure will be applied by the pulling out of the piston toward the bayonette end of the piston rod. Such motion will be caused by pressure from the inflating slide. When such occurs the coil spring will be compressed tending to resist the pulling out of the piston. Further movement of the piston is resisted in a controlled fashion through the movement of the silicone oil from the primary or outboard side to the secondary or inboard side of the cylindrical housing. The control is effected through the precise milling of the radial orifices in the piston. This movement continues until the channeled segment of the piston shaft are both exterior of the cylindrical chamber whereupon release of the restraint device and separation of the remote portions of the inflatable slide are effected due to the separation of the channels and the piston rod portions. Separation of the piston rod segments is initially constrained by the inner surface of the cylindrical wall. Separation of the piston rod segments is eventually effected by the movement of the channels to outside the cylindrical housing with the assistance of the beveled shape of the mating surfaces of the separable piston rod portions.

Figure 5:
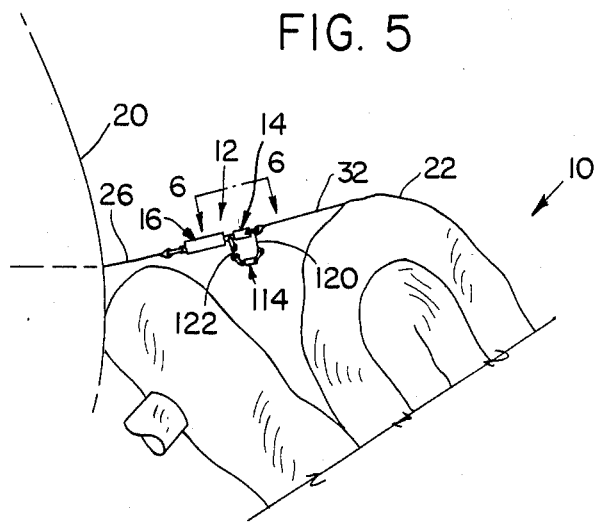
FIG. 5 is a partial side elevational view similar to FIG. 1 but illustrating a secondary embodiment of the invention, an embodiment with secondary delayed restraint release mechanisms in parallel with the primary mechanisms.
Figure 6:
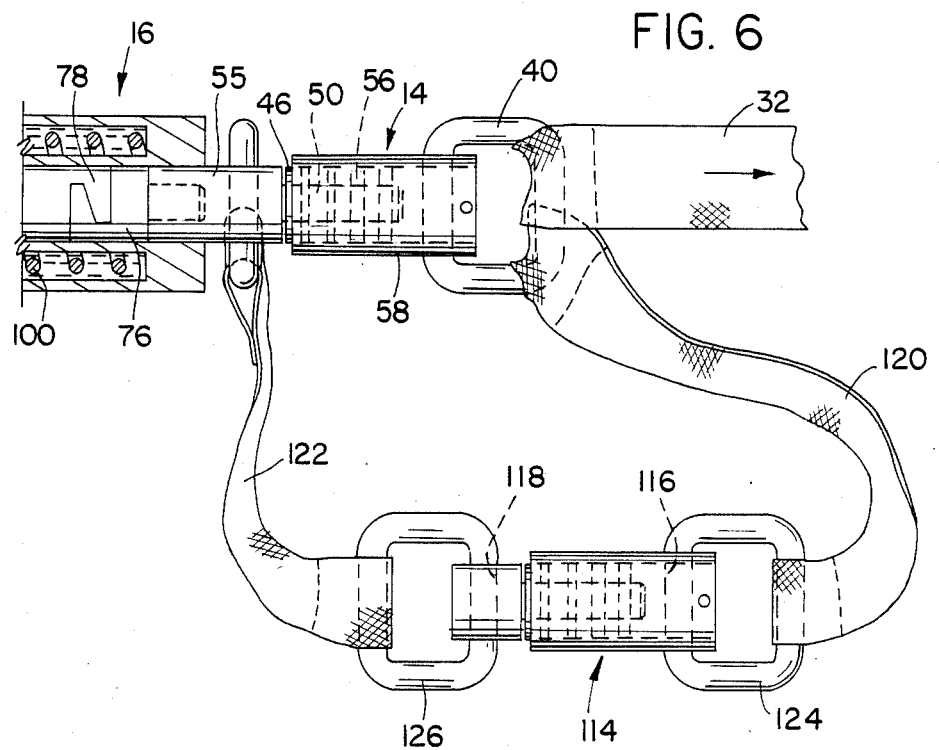
FIG. 6 is an enlarged plan view of the delayed release restraint device taken along line 6—6 of FIG. 5 showing the device in greater detail and with parts broken away to show internal constructions thereof.

The secondary embodiment of the invention is shown in FIGS. 5 and 6. This embodiment effectively operates in the same manner as the primary embodiment except it has an additional shear pin mechanism 114 in parallel with the primary mechanisms. In the secondary embodiment of FIGS. 5 and 6, like reference numerals are employed as in the primary embodiment of FIGS. 1 through 4 since their structure and function remain identical.

The secondary embodiment as shown in FIGS. 5 and 6 includes a supplemental ring mounted intermediate the previously described rings. The supplemental ring is mounted through a radial hole in the exterior portion of the piston rod. Supplemental straps are provided and attached to supplemental rings on opposite sides of a secondary shear pin release mechanism.

The lug with its apertures and its apertured mating cylinder along with the sheath, pin and shear pins all are constructed and function as a redundant release mechanism as the primary release mechanism of the preferred embodiment. Additionally, the lug and cylinder are provided with apertures 116 and 118 for coupling the supplemental straps 120 and 122 through supplemental rings 124 and 126.

In the event that the shear pins of the primary shear pin mechanism are broken by a high shock load, the secondary set of shear pins of the secondary shear pin mechanism will function in a redundant fashion to preclude premature separation of the system.

While the present invention has been described as carrying out a particular embodiment thereof, it is not intended to be so limited but it is intended to be covered broadly within the spirit and scope of the appended claims.

What is claimed is:

1. In an inflatable emergency evacuation slide having an inboard end and an outboard end, a delayed restraint release device comprising:

strap means having a pair of spaced ends, one of said ends connected to a portion of said slide remote from said inboard end and the other of said ends adapted to be connected to an aircraft from which said evacuation slide is to be deployed, a separable mechanism coupling said strap means together at a location intermediate said spaced ends to temporarily preclude deployment of said slide, means to retard separation of said separable mechanism including a housing, a piston within said housing, an aperture in said piston, and a fluid within said housing moveable from one side of said piston to the other side of said piston through said aperture in said piston.

2. The device as set forth in claim 1 wherein said piston includes a piston rod formed of two parts retained together within said housing prior to deployment of the slide but separable upon movement caused by deployment of the slide as said two parts move out of said housing.

3. The device as set forth in claim 1 and further including a coil spring within the housing coupling said housing and said piston to provide further resistance to the movement of said piston within said housing.

4. The device as set forth in claim 1 and further including an additional separable mechanism in series with the first mentioned separable mechanism.

5. The device as set forth in claim 4 wherein said additional separable mechanism includes a bored cylinder and mating lug, said cylinder and said lug being apertured, and a shear pin extending through said apertures in said lug and said cylinder for separation upon receiving a predetermined pressure.

6. The device as set forth in claim 5 and further including a third separable mechanism in parallel with said additional separable mechanism.

7. In an inflatable emergency evacuation slide, a delayed restraint release device comprising:

strap means with spaced ends for coupling a remote portion of evacuation slide to an aircraft to temporarily preclude full deployment of the slide, a separable mechanism coupling said strap means together at a location intermediate said spaced ends, means to retard separation of said separable mechanism including a housing, a piston within said housing, an aperture in said piston, said piston including a piston rod formed of two parts retained together by said housing prior to deployment of the slide but separable upon movement caused by deployment of the slide as said two parts move to the exterior of said housing, and a fluid within said housing moveable from one side of piston to the other side through said aperture in said piston, and further including an additional separable mechanism in series with the first mentioned separable mechanism.

* * * * *